No. 754,019. PATENTED MAR. 8, 1904.
W. H. SOLEY.
PNEUMATIC TOOL.
APPLICATION FILED OCT. 29, 1903.
NO MODEL. 3 SHEETS—SHEET 1.

WITNESSES:
M. H. Ellis
William B. Marks.

INVENTOR
William H. Soley
BY
Harding & Harding
ATTORNEYS

No. 754,019. PATENTED MAR. 8, 1904.
W. H. SOLEY.
PNEUMATIC TOOL.
APPLICATION FILED OCT. 29, 1903.
NO MODEL. 3 SHEETS—SHEET 2.
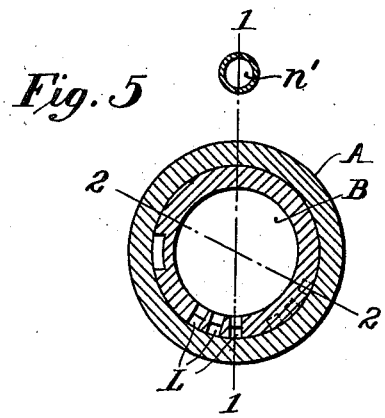
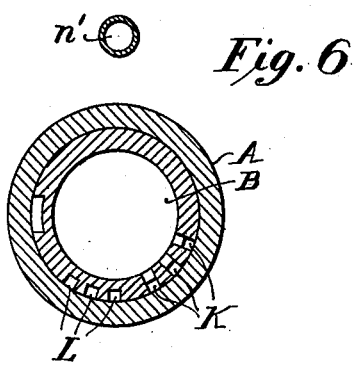
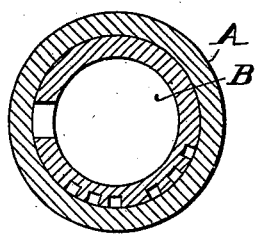
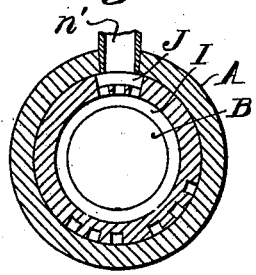
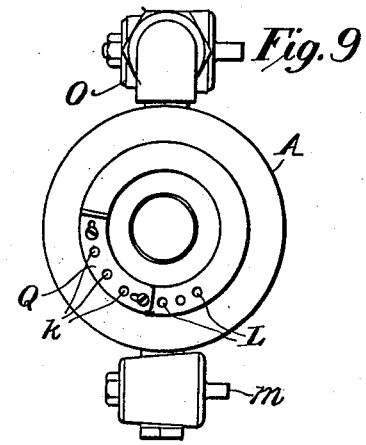
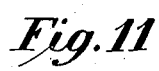
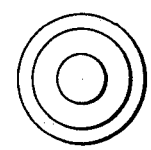
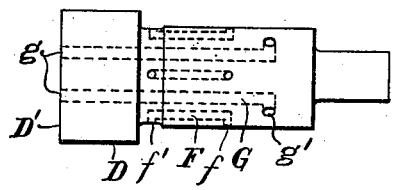
WITNESSES:
M. H. Ellis
William B. Marks.
INVENTOR
William H. Soley
BY
Harding & Harding
ATTORNEYS No. 754,019. PATENTED MAR. 8, 1904.
W. H. SOLEY.
PNEUMATIC TOOL.
APPLICATION FILED OCT. 29, 1903.
NO MODEL. 3 SHEETS—SHEET 3.

WITNESSES:
W. W. Canby
M. M. Hamilton

INVENTOR
William H. Soley
BY
Harding & Harding
ATTORNEYS

No. 754,019. Patented March 8, 1904.

UNITED STATES PATENT OFFICE.

WILLIAM H. SOLEY, OF PHILADELPHIA, PENNSYLVANIA, ASSIGNOR OF ONE-HALF TO THOS. H. DALLETT CO., A CORPORATION OF NEW JERSEY.

PNEUMATIC TOOL.

SPECIFICATION forming part of Letters Patent No. 754,019, dated March 8, 1904.

Application filed October 29, 1903. Serial No. 179,029. (No model.)

*To all whom it may concern:*

Be it known that I, WILLIAM H. SOLEY, a citizen of the United States, residing at Philadelphia, county of Philadelphia, and State of Pennsylvania, have invented a new and useful Improvement in Pneumatic Tools, of which the following is a full, clear, and exact description, reference being had to the accompanying drawings, which form a part of this specification.

My invention has for its object the production of a tool in that class of cutting-tools known as "pneumatic" tools, which can be used either as a valve or valveless tool. In certain classes of work it is desirable to use a valve-tool, while in other classes of work a valveless tool is more desirable.

My improved tool is interchangeably either a valved or valveless tool.

My invention also comprises various details of construction to enable this result to be obtained.

I will first describe the embodiment of my invention as illustrated in the accompanying drawings and then point out the invention in the claims.

Figure 1:
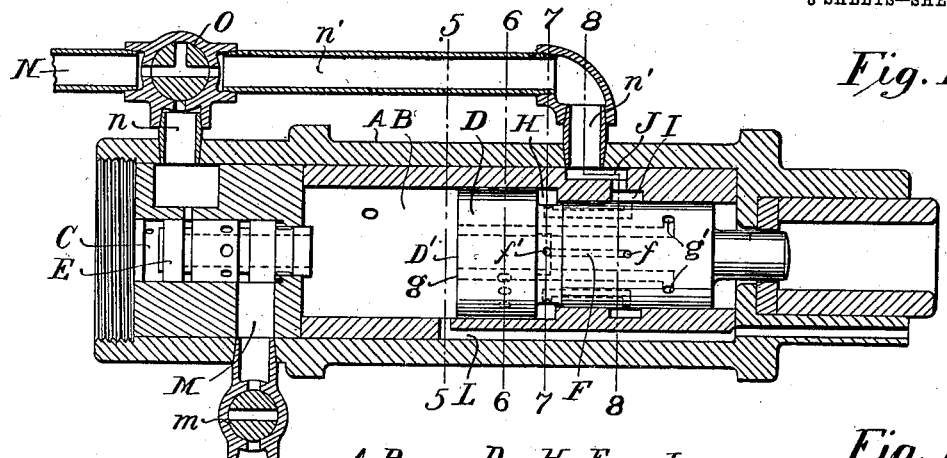
Figure 2:
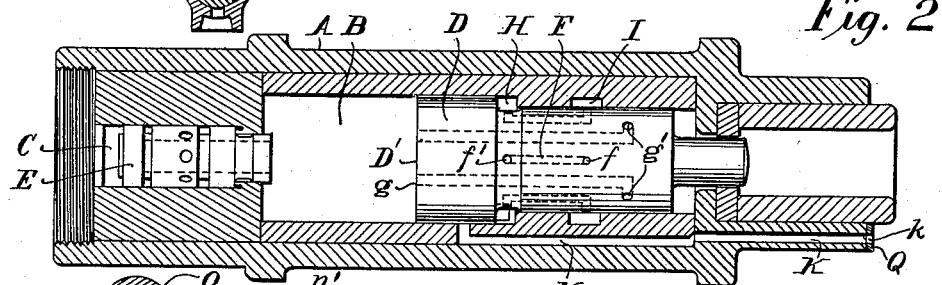
Figure 3:
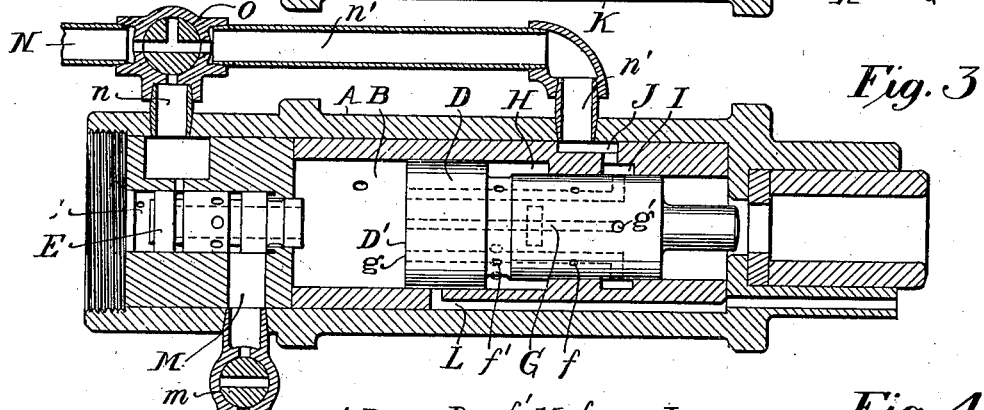
Figure 4:
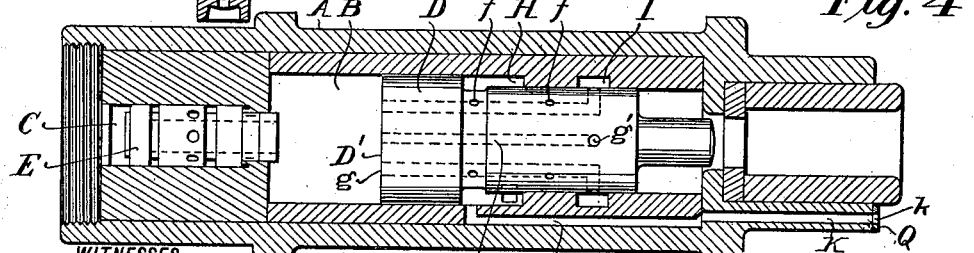
Figure 13:
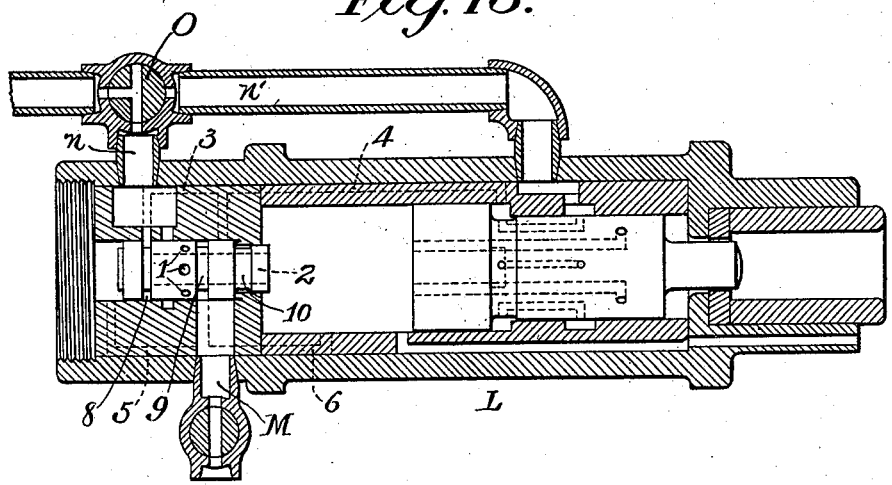
Figure 14:
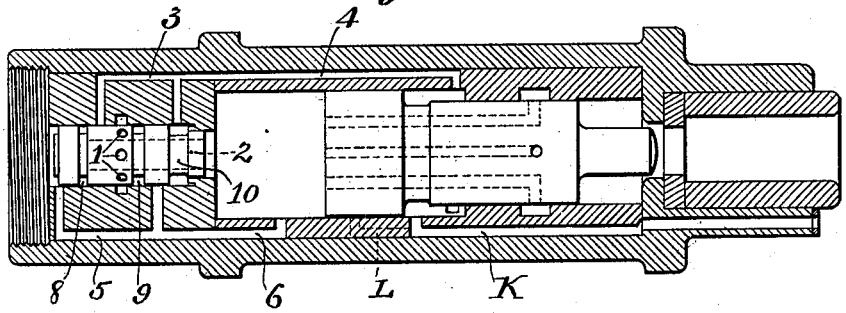

In the drawings, Figure 1 is a sectional view of tool when acting as a valveless tool on line 1 1, Fig. 5, showing piston in its lower position. Fig. 2 is a sectional view of tool when acting as a valveless tool on line 2 2, Fig. 5, showing piston in its lower position. Fig. 3 is a sectional view similar to Fig. 1 with piston in its upper position. Fig. 4 is a sectional view of tool similar to Fig. 2 with piston in its upper position. Fig. 5 is a section on line 5 5, Fig. 1. Fig. 6 is a section on line 6 6, Fig. 1. Fig. 7 is a section on section-line 7 7, Fig. 1. Fig. 8 is a section on line 8 8, Fig. 1. Fig. 9 is a bottom view of tool. Fig. 10 is a detail view of piston. Fig. 11 is a top view of same. Fig. 12 is a bottom view of same. Fig. 13 is a sectional view of the tool when acting as a valved tool with the piston at one end of its stroke. Fig. 14 is a similar view when the tool is acting as a valved tool with the piston at the other end of its stroke.

A is the casing of a pneumatic tool; B, the piston-chamber; C, the valve-chamber; D, the piston, and E the valve. So far as the valve is concerned and the ports and passages to and from the piston-chamber, which it controls and by means of which it is controlled, they may be of any desired well-known construction. In the specific construction shown the valve has through it a series of orifices 1, terminating in a longitudinal passage 2, opening into the top of the piston-chamber. 3, 4, 5, and 6 are passages leading from the valve-chamber to the various parts of the piston-chamber, as shown. There are on the valve the circumferential grooves 8 9 10, and M is an exhaust from the valve-chamber. As these details form no part of my invention, I have not specifically illustrated them, nor will I specifically describe them.

The piston which I use is provided with two vertical series of passages, one series being designated as F and the other as G. The series F have the lower ports $f$ and the upper ports $f'$ through the piston to the piston-chamber. The upper ports $f'$ pass through the piston at a point below the head D' of the piston. In like manner the series G have the upper ports $g$ passing through the top of the head D' of the piston and the lower ports $g'$ extending through the piston below the ports $f$. The piston-chamber C is formed with the enlarged portion H and the smaller portion with a groove I.

J is a passage leading from groove I to the exterior of the tool.

K and L are two sets of exhaust-passages from the cylinder.

M is an exhaust-passage from the valve-chamber E. In this passage is the valve $m$.

N is a passage leading from the source of air-supply, having a connection with the valve-chamber through passage $n$ and with the passage $n'$, leading to passage J. In the passage N contiguous to passage $n$ is placed a three-way valve O. By turning this valve air may be cut off from both passages $n$ and $n'$ or admitted to either passages $n$ or $n'$. By turning the valve $m$ the valve-chamber C may be connected with or cut off from the exhaust.

When the valve O is turned so as to admit air to passage n and cut off air from passage n' and the passage M opened, the tool operates as in an ordinary valve-tool. When, however, the valve O is turned to admit air to passage n' and the passage M is closed, the tool operates in the following manner as a valveless tool. Taking first the position of the parts as shown in Figs. 1 and 2, the air enters the passage J to groove I, from thence through passages F to the enlarged portion of the piston-chamber H below head D'. The air above the piston exhausts through passage L, and the piston rises to the position shown in Fig. 3. When the parts are in the position shown in Figs. 3 and 4, the passages G register with the groove I and live air passes to the piston-chamber above the piston. In this position the passages F register with the exhaust-passages K and the piston descends. This completes the cycle of operation.

In order to close the exhaust-passages K when the tool is operating as a valve-tool, I provide the following mechanism: Upon the bottom of the tool I secure the plate Q, which has the orifices k, corresponding to the passages K. The plate Q is slidably mounted. By sliding this plate Q these orifices k may be made to register with passages K. When the tool is being used as a valve-tool, the plate Q is moved, so as to bring the orifices k out of alinement with passages K. When the tool is to be used as a valved tool, the valve O is turned, so as to admit air to the passage n and cut off air from the passage n', and the valve m is turned, so as to open the exhaust-passage M from the valve-chamber E. In the position shown in Fig. 14 the air passes through the orifices 1 into the passage 2 and thence to the piston-chamber on top of the piston. The air below the piston is exhausted through the passage 4, thence through the groove 10 to the exhaust M. Under these conditions the piston descends until the upper end of the piston passes below the opening into the passage 6, when the air behind the piston passes to the top of the valve, shifting the valve to the position shown in Fig. 13. When the valve is shifted, as shown, the circumferential groove 8 is opposite the air-inlet and the passage 3 and live air is admitted to the piston-chamber below the piston-head. The passage 6 is then through the annular groove 9 in communication with the exhaust M and the piston ascends. The passages L act to relieve the pressure behind the piston when it has risen above the openings from said passage into the piston-chamber. The piston rises until it passes beyond the opening in the passage 6 of the piston-chamber, when the air above the piston, being trapped, will act to shift the valve to the position shown in Fig. 14.

I do not intend to limit myself to the details of construction hereinbefore described except as the same may be specifically claimed.

Having now fully described my invention, what I claim, and desire to protect by Letters Patent, is—

1. In a pneumatic tool, in combination with a piston and piston-chamber and a valve, of a source of pressure-supply and connection between said source of pressure-supply and the piston-chamber controlled by the valve, connection between said source of pressure-supply and the piston-chamber independent of the valve, and means to control said connections.

2. In a pneumatic tool, in combination with a piston and piston-chamber and a valve, of a source of pressure-supply and the piston-chamber controlled by the valve, connection between said source of pressure-supply and the piston-chamber independent of the valve, a valve adapted in its movement to open one of said connections and close the other and vice versa.

3. In a pneumatic tool of the character described, in combination, a casing, a piston-chamber and a valve-chamber in said casing, a valve in the valve-chamber, a piston in the piston-chamber, a passage adapted to convey a pressure fluid from a source of pressure-supply, connection between said passage and the valve-chamber and connection between said passage and the piston-chamber, and means to control the connections between said passages and valve and piston chamber.

4. In a pneumatic tool of the character described, in combination, a casing, a piston-chamber and a valve-chamber in said casing, a valve in the valve-chamber, a piston in the piston-chamber, a passage adapted to convey a pressure fluid from a source of pressure-supply, connection between said passage and the valve-chamber and connection between said passage and the piston-chamber, and means to make connection between said passage and said connections, and means to cut off the pressure-supply in said passage.

5. In a pneumatic tool of the character described, in combination, a casing, a piston-chamber and a valve-chamber in said casing, a valve in the valve-chamber, a piston in the piston-chamber, a passage adapted to convey a pressure fluid from a source of pressure-supply, connection between said passage and the valve-chamber and connection between said passage and the piston-chamber, a valve adapted in its movement to either open connection between the valve-chamber connection and said passage and cut off the connection between the passage and the piston-chamber or vice versa.

6. In a pneumatic tool of the character described, in combination, a casing, a piston-chamber and a valve-chamber in said casing, a valve in the valve-chamber, a piston in the piston-chamber, a passage adapted to convey a pressure fluid from a source of pressure-supply, connection between said passage and the valve-chamber and connection between said passage and the piston-chamber, a three-way valve adapted to cut off or open connection between said passage and said valve and piston chambers and between said passage and the source of pressure-supply.

7. In a pneumatic tool, in combination, a piston-chamber, a piston in said chamber, a valve-chamber, a valve therein, means to operate said piston controlled by the valve, means to operate said piston independent of the valve, a passage having an opening into the piston-chamber at the lifting end of the piston-chamber and an outlet to the atmosphere and means, independent of the piston, to open and close said outlet.

8. In a pneumatic tool, in combination, a piston-chamber, a piston in said chamber, a valve-chamber, a valve therein, means to operate said piston controlled by the valve, means to operate said piston independent of the valve, a passage having an opening into the piston-chamber and having an outlet to the atmosphere, a plate controlling said outlet, an orifice in said plate corresponding to said outlet, said plate being slidably mounted and adapted to close the first-mentioned outlet, or cause the orifice in the plate to register with said outlet.

9. In a pneumatic tool, in combination, a piston-chamber, a piston in said chamber, a valve-chamber, a valve therein, means to operate said piston controlled by the valve, means to operate said piston independent of the valve, a plurality of passages each having an opening into the piston-chamber and outlets to the atmosphere, a plate controlling said outlets having openings corresponding to the said outlets, said plate being slidably mounted to cause the outlets to register with the solid portion of said plate.

In testimony of which invention I have hereunto set my hand, at Philadelphia, on this 19th day of October, 1903.

WILLIAM H. SOLEY.

Witnesses:
M. F. ELLIS,
M. M. HAMILTON.